US012793413B2

(12) United States Patent
Biswas et al.

(10) Patent No.: US 12,793,413 B2
(45) Date of Patent: Nov. 10, 2026

(54) SEMI-SUPERVISED VIDEO TEMPORAL ACTION RECOGNITION AND SEGMENTATION

(71) Applicant: Intel Corporation, Santa Clara, CA (US)

(72) Inventors: Sovan Biswas, Bonn (DE); Anthony Rhodes, Portland, OR (US); Ramesh Manuvinakurike, Santa Clara, CA (US); Giuseppe Raffa, Portland, OR (US); Richard Beckwith, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/936,941

(22) Filed: Sep. 30, 2022

(65) Prior Publication Data

US 2023/0024803 A1 Jan. 26, 2023

(51) Int. Cl.

| | |
|---|---|
| ***G06V 20/40*** | (2022.01) |
| ***G06V 10/774*** | (2022.01) |
| ***G06V 10/776*** | (2022.01) |
| ***G06V 10/94*** | (2022.01) |
| ***G06V 20/70*** | (2022.01) |
| *G06V 10/82* | (2022.01) |

(52) U.S. Cl.
CPC ............ *G06V 20/41* (2022.01); *G06V 10/774* (2022.01); *G06V 10/776* (2022.01); *G06V 10/94* (2022.01); *G06V 20/49* (2022.01); *G06V 20/70* (2022.01); *G06V 10/82* (2022.01)

(58) Field of Classification Search
CPC .... G06V 20/41; G06V 10/774; G06V 10/776; G06V 10/94; G06V 20/49; G06V 20/70; G06V 10/82; G06V 10/754; G06V 10/7753; G06V 40/20
See application file for complete search history.

(56) References Cited

U.S. PATENT DOCUMENTS

| | | | | |
|---|---|---|---|---|
| 2018/0232604 A1* | 8/2018 | Seybold | ............... | G06N 3/0464 |
| 2021/0174093 A1* | 6/2021 | Li | .......................... | G06N 3/094 |
| 2022/0335718 A1* | 10/2022 | Ma | ......................... | G06V 20/70 |

* cited by examiner

*Primary Examiner* — Tom Y Lu
(74) *Attorney, Agent, or Firm* — Nicholson De Vos Webster & Elliott LLP

(57) ABSTRACT

Systems, apparatuses, and methods include technology that generates final frame predictions for a first plurality of frames of a video, where the first plurality of frames is associated with unlabeled data. The technology predicts an ordered list of actions for the first plurality of frames based on the final frame predictions, and temporally aligning the ordered list of actions to the final frame predictions to generate labels.

25 Claims, 8 Drawing Sheets

SEMI-SUPERVISED VIDEO TEMPORAL ACTION RECOGNITION AND SEGMENTATION

TECHNICAL FIELD

Embodiments generally relate to training an input data (e.g., video, audio, etc.) segmentation and labelling model. More particularly, embodiments relate to enhancing a training of a segmentation, action prediction and labelling machine learning model through a semi-supervised training process.

BACKGROUND

Some real-world automation domains require frame-level action segmentation and labelling across challenging, long duration data (e.g., videos and audio recordings). Identifying temporal action segments in input data is challenging despite having distinct temporal steps in certain processes (e.g., manufacturing, industry, travel, etc.). This difficulty is due to the variability in the temporal order, the length of actions in the process, and inter/intra class variability in action classes.

In order to identify such temporal action segments, a machine learning model(s) may be trained. The availability of annotated data poses a challenge for training. Annotating each time instant of a long untrimmed input data (e.g., video) with action labels is time-consuming, cost-intensive and impractical for many types of input data. For example, the input data may include over ten-thousand hours of video which results in significant overhead, expense and latency to annotate. The cost increases further if scaling upward to handle various (manufacturing or other domain) processes is needed.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Examples circumvent costly and lengthy annotation costs for training data. In detail, examples annotate only a small fraction of the annotated videos and then leverage the domain knowledge of ordered manufacturing action and/or steps to learn (e.g., train) on a sizeable corpus of unlabeled data. Thus, examples include semi-supervised training approaches to not only reduce the annotation cost for training a machine learning model (e.g., neural network(s)), but to also generate a robust final machine learning model. Further, since embodiments train on a reduced amount of annotated data, examples may rapidly scale to a broader range of domains (e.g., do-it-yourself, daily activities, and/or other specialized environments).

Therefore, examples reduce the initial development cost and time of the AI system by leveraging the domain knowledge of ordered manufacturing actions/steps rather than explicitly stating such actions/steps through annotations. Examples may readily reduce development cost by reducing the effort of expert annotators and technical (e.g., artificial intelligence (AI)) development experts by annotating only a limited set of videos. Examples further ease scalability of such systems to a broad range of domains by leveraging the domain knowledge of a respective process (e.g., manufacturing).

Figure 1:
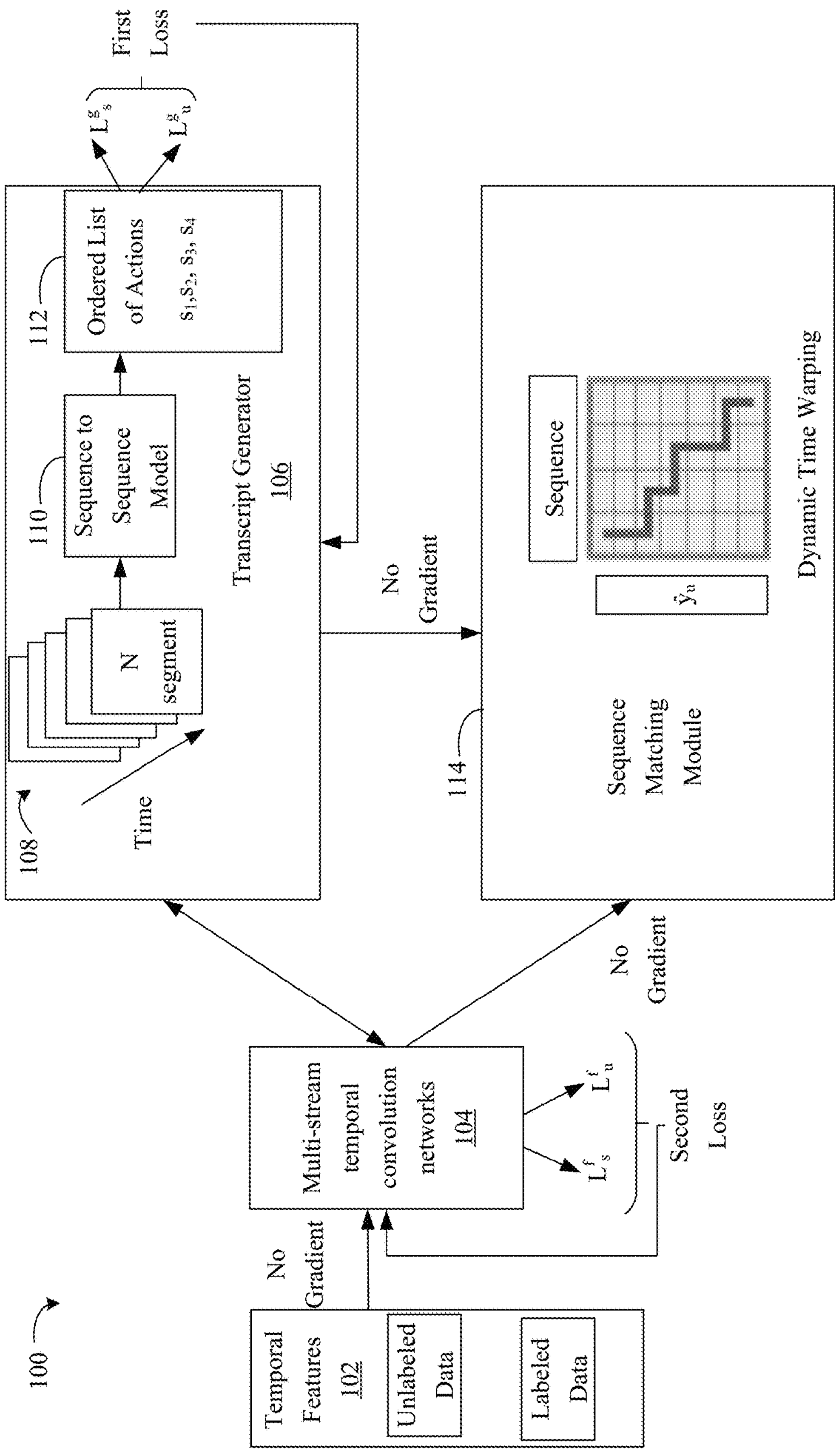
FIG. 1 is an example of a semi-supervised machine learning architecture according to an embodiment.

Turning to FIG. 1, a semi-supervised machine learning architecture 100 is illustrated. The semi-supervised machine learning architecture 100 may be in a training phase. After the semi-supervised machine training architecture 100 is trained, the semi-supervised machine training architecture 100 may execute inference to segment videos and identify action within segments of the video.

As will be explained below, the semi-supervised machine training architecture 100 generates soft labels based on predictions of the multi-stream temporal convolution networks 104 (e.g., segmentation models) and actions generated by the transcript generator 106. Initially, a datastore (e.g. a hard drive, solid state drive, memory, remote storage, etc.) may store temporal features 102. The temporal features 102 may be time dependent data (e.g., evolves over time). A fraction of the temporal features 102 may be labeled data (e.g., frames with human-generated labels classifying actions in respective portions of the labeled data), while a majority (e.g., a vast majority) may unlabeled data (e.g., frames with no human-generated labels).

Multi-stream temporal convolution networks 104 include multiple networks (e.g., different streams, first machine learning models, temporal segmentation machine learning models such as multi-stage temporal convolutional network++ (MSTCN++), etc.) that distill knowledge and accumulate predictions to generate robust predictions and train based on the labeled data and the unlabeled data. The multi-stream temporal convolution networks 104 may operate to distill knowledge through a series of networks. In distillation, knowledge is transferred from a first model (e.g., a teacher model) to other model(s) (e.g., student model(s)) by minimizing a loss function in which the target is the distribution of class probabilities predicted by the teacher model.

Knowledge distillation may have various applications. For example, the multi-stream temporal convolution networks 104 may learn from noisy labels to transfer knowledge from larger models to smaller ones. Some examples use a knowledge distillation approach to refine downstream models' capabilities based on a base-stream model's knowledge. Doing so retains a generality of the base-stream model, and further, refines segmentation and classifications based on the additional information obtained from unannotated videos.

For example, neural networks typically produce class probabilities (e.g., action probabilities) by using a "softmax" output layer that may convert a logit $z_i$ (e.g., an input to the final softmax output layer), computed for each class into a probability, $q_i$, by comparing $z_i$ with the other logits as shown in Equation 1 below.

$$q_i = \frac{(\exp(z_j/T)}{\sum_j (\exp(z_j/T)} \quad \text{Equation 1}$$

In Equation 1, T is a temperature that is normally set to 1. Using a higher value for T produces a softer probability distribution over classes. In the simplest form of distillation, knowledge is transferred to the distilled model by training the distilled model on a transfer set and using a soft target distribution for each case in the transfer set that is produced by using the cumbersome model with a high temperature in its softmax. The same high temperature is used when training the distilled model, but after it has been trained it uses a temperature of 1.

In some examples, each stream of the multi-stream temporal convolution networks 104 is an independent equal-sized multi-stage temporal convolutional network++ (MSTCN++ or a temporal segmentation model) with different initializations. The MSTCN++ models may be linked together to receive outputs from each other, and further trained on different subsets of the unlabeled data and labeled data. The predictions of the different streams are accumulated together to form final predictions. For example, a first frame may be associated with twenty predictions generated by twenty different streams. A final prediction for the frame maybe an average of all twenty predictions, majority prediction of the twenty predictions, a probability of a majority prediction being correct (e.g., if ten predictions predict a first action which is a majority prediction from all streams, the probability would be 50%), and/or may include probabilities assigned to each action based on how many predictions correspond (e.g., select) the action (e.g., if five predictions categorize a frame as being a first action, then the first action may have a probability of 25%, a second action may have a probability of 20%, etc.).

The multi-stage temporal convolutional networks 104 generates predictions (e.g., class labels, action labels, etc.) from multiple streams (e.g., machine learning models) to provide robustness in predicting transitions between different actions. Examples may accumulate predictions from the multiple streams to generate final predictions. The accumulation of predictions enhances the prediction consistency, further boosting the performance. Loss $L^f_s$ and Loss $L^f_u$ denote the cross-entropy losses over labeled and unlabeled data, respectively. The multi-stage temporal convolutional networks 104 may be trained based on the Loss $L^f_s$ and the Loss $L^f_u$. In some examples, only models of the temporal multi-stage temporal convolutional networks 104 that classify both the labeled and unlabeled data are updated based on the Loss $L^f_s$ and the Loss $L^f_u$, while other models of the temporal multi-stage temporal convolutional networks 104 are updated based on the Loss $L^f_s$ but not the Loss $L^f_u$.

The predictions (e.g., a probability that a frame falls within a certain class) may be provided to transcript generator 106. The transcript generator 106 (e.g., a second machine learning model) may identify a series of segments 108. For example, the transcript generator 106 may Maxpool the class-wise frame predictions from the multi-stream temporal convolution networks 104 temporally into a series segments (e.g., N total segments) of temporally ordered max pool predictions. The N segments form the input to the sequence-to-sequence model 110. The series of segments 108 may correspond to the labeled data and unlabeled data. The value for N may be found empirically. Doing so may permit different length videos to be analyzed. By dividing each video into a certain number of segments, examples may avoid biases due to different length videos. Thus a relatively short video will have shorter segments, while a long video will have longer segments. Doing so removes the impact of having different sized input data (e.g., videos).

The labeled data (e.g., annotated training data) contains frame-wise action labels for a video sequence. Examples also represent this data as a sequence of action steps performed in the video. So, for any video sequence, examples may learn the sequence of action steps taken to complete the task.

To do so, the sequence to sequence model 110 may be a Long Short-Term Memory (LTSM) network. The sequence-to-sequence model 110 generates a sequence of action steps illustrated as an ordered list of actions 112. $S_1$, $S_2$, $S_3$, $S_4$ are generated based on the frame-wise predictions of the multi-stream temporal convolution networks 104. For example, for each respective segment of frames of the series of segments 108, the sequence-to-sequence model 110 may average the frame-wise predictions of the frames comprising the respective segment, and select the average as the prediction for the respective segment.

Some examples order actions for the unlabeled data with the sequence-to-sequence model 110 and the frame predictions from the multi-stream temporal convolution networks 104 for unlabeled data. Examples include the sequence-to-sequence model 110 to provide robustness to a change of ordered action steps from one video to another. Loss $L^g_s$ and loss $L^g_u$ denote the cross sequence-to-sequence learning losses over labeled and unlabeled data, respectively. The transcript generator 106 may be updated (e.g., biases, weights activation functions) based on the Loss $L^g_s$ and loss $L^g_u$ which may also be collectively referred to as a first loss.

The transcript generator 106 may provide the ordered list of action 112 to a sequence matching module 114. The sequence matching model 114 may match the ordered list of action 112 to the probabilities generated by the multi-stream temporal convolution networks 104. To generate soft labels, examples predict the sequence of actions performed on the unannotated video sequence. In detail, the sequence matching module 114 executes a dynamic time warping (DTW) process on the expected action sequence to generate frame-wise soft labels by temporal alignment based on prediction logits of the multi-stream temporal convolution networks 104. DTW is a linear space algorithm for computing maximal common subsequences. DTW is used to compare the similarity or calculate the distance between two objects (e.g., arrays or time series) with different lengths. DTW performs the temporal alignment mentioned above by comparing the predictions of the frame-wise predictions to the actions. Each frame may be classified into an action based on a DTW comparison of the frame-wise predictions to the actions.

In some examples, the temporal alignment is performed only on the unlabeled data (e.g., un-annotated video sequences). The sequence matching module 114 generates soft labels. The soft labels may be determined based on the frames (or segments of frames) to the actions. For example, horizontal axis on the DTW graph may be frames (e.g., or segments of frames) while the vertical axis may represent actions.

The soft-label generation has two key components. First, examples predict the ordered list of actions 112 with the sequence-to-sequence model 110 for the unannotated videos. Then, the sequence matching module 114 temporally aligns the ordered list of actions 112 to the frame predictions of the multi-stream temporal convolution networks 104 of the segmentation to generate the soft labels.

Thus, embodiments introduce an approach to train the multi-stream temporal convolution networks 104 from semi-supervision. Embodiments compute frame labels for an unannotated video aligned to the predicted temporal order of actions. The multi-stream temporal convolution networks 104 repeatedly refines and accumulate predictions to reduce any noise that may arise from overfitting the limited training data. Thus, embodiments herein reduce the level of annotated data that is needed to execute training. Doing so reduces, latency, human resources and cost for training.

Figure 2:
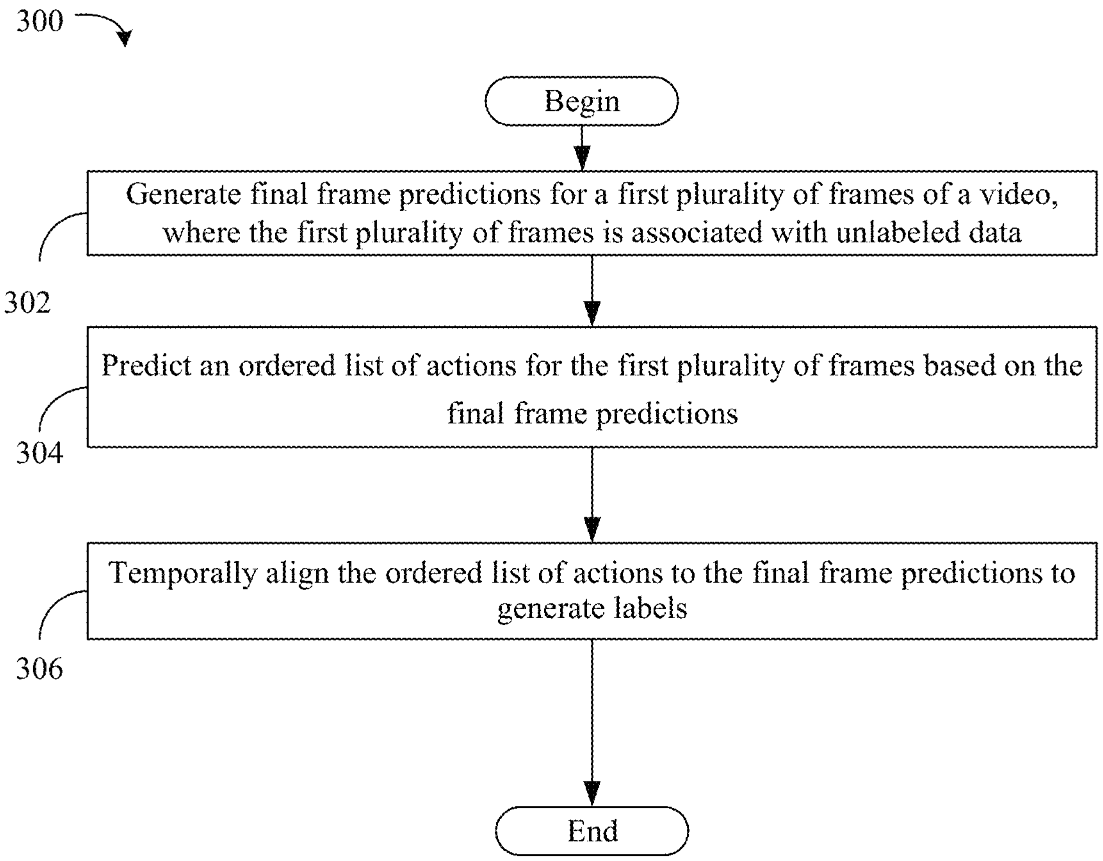
FIG. 2 is a flowchart of an example of a method of semi-supervised training according to an embodiment.

FIG. 2 shows a method 300 of executing semi-supervised training with according to embodiments herein. The method 300 may generally be implemented with the embodiments described herein, for example, the semi-supervised machine learning architecture 100 (FIG. 1) already discussed. More particularly, the method 300 may be implemented in one or more modules as a set of logic instructions stored in a machine-or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), general purpose microprocessor or combinational logic circuits, and sequential logic circuits or any combination thereof. The configurable or fixed-functionality logic can be implemented with complementary metal oxide semiconductor (CMOS) logic circuits, transistor-transistor logic (TTL) logic circuits, or other circuits.

For example, computer program code to carry out operations shown in the method 300 may be written in any combination of one or more programming languages, including an object-oriented programming language such as JAVA, SMALLTALK, C++ or the like and conventional procedural programming languages, such as the “C” programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 302 generates final frame predictions for a first plurality of frames of a video, where the first plurality of frames is associated with unlabeled data. Illustrated processing block 304 predicts an ordered list of actions for the first plurality of frames based on the final frame predictions. Illustrated processing block 306 temporally aligns the ordered list of actions to the final frame predictions to generate labels.

In some examples, the method 300 includes generating a first loss based on the final frame predictions, generating a second loss based on the ordered list of actions, updating a first machine learning model based on the first loss, where the first machine learning model is to generate the final frame predictions, and updating a second machine learning model based on the second loss, wherein the second machine learning model is to predict the ordered list. In such examples the first machine learning model includes a plurality of temporal segmentation machine learning models, and the method 300 further comprises generating, with a first temporal segmentation machine learning model of the plurality of temporal segmentation machine learning models, first frame predictions based on the first plurality of frames, and generating, with a second temporal segmentation machine learning model of the plurality of temporal segmentation machine learning models, second frame predictions based on the first plurality of frames. In such examples, the generating the final frame predictions includes accumulating the first frame predictions and the second frame predictions. In some examples, the method 300 further includes training the first and second temporal segmentation machine learning models based on the labels and the final frame predictions, and bypassing a third temporal segmentation machine learning model of the plurality of temporal segmentation machine learning models from being trained based on the labels and the final frame predictions.

In some examples, the temporally aligning includes executing a dynamic time warping process. Further in some examples a second plurality of frames of the video are associated with labeled data, and the temporally aligning includes temporally aligning a first subset of actions from the ordered list of actions associated with the first plurality of frames and a first subset of the final frame predictions associated with the first plurality of frames, and bypassing a second subset of actions from the ordered list of actions associated with the second plurality of frames and a second subset of the final frame predictions associated with the second plurality of frames.

The method 300 may facilitate low latency training while still providing robust results. Embodiments achieve significant performance (e.g., accuracy of action identification and classification of frames into action classes) despite the limited amount of annotated data. Examples introduces a scalable approach that enables training a Temporal Action Recognition model from a limited amount of annotated data in data-driven artificial intelligence (e.g., machine learning) systems. Examples reduce the cost of initial deployment with comparable performance to other systems that utilize fully annotated data. Examples predicts the action order for the un-annotated video sequences. This action order is then temporally aligned to frame-wise soft labels to be utilized further for training.

Figure 3:
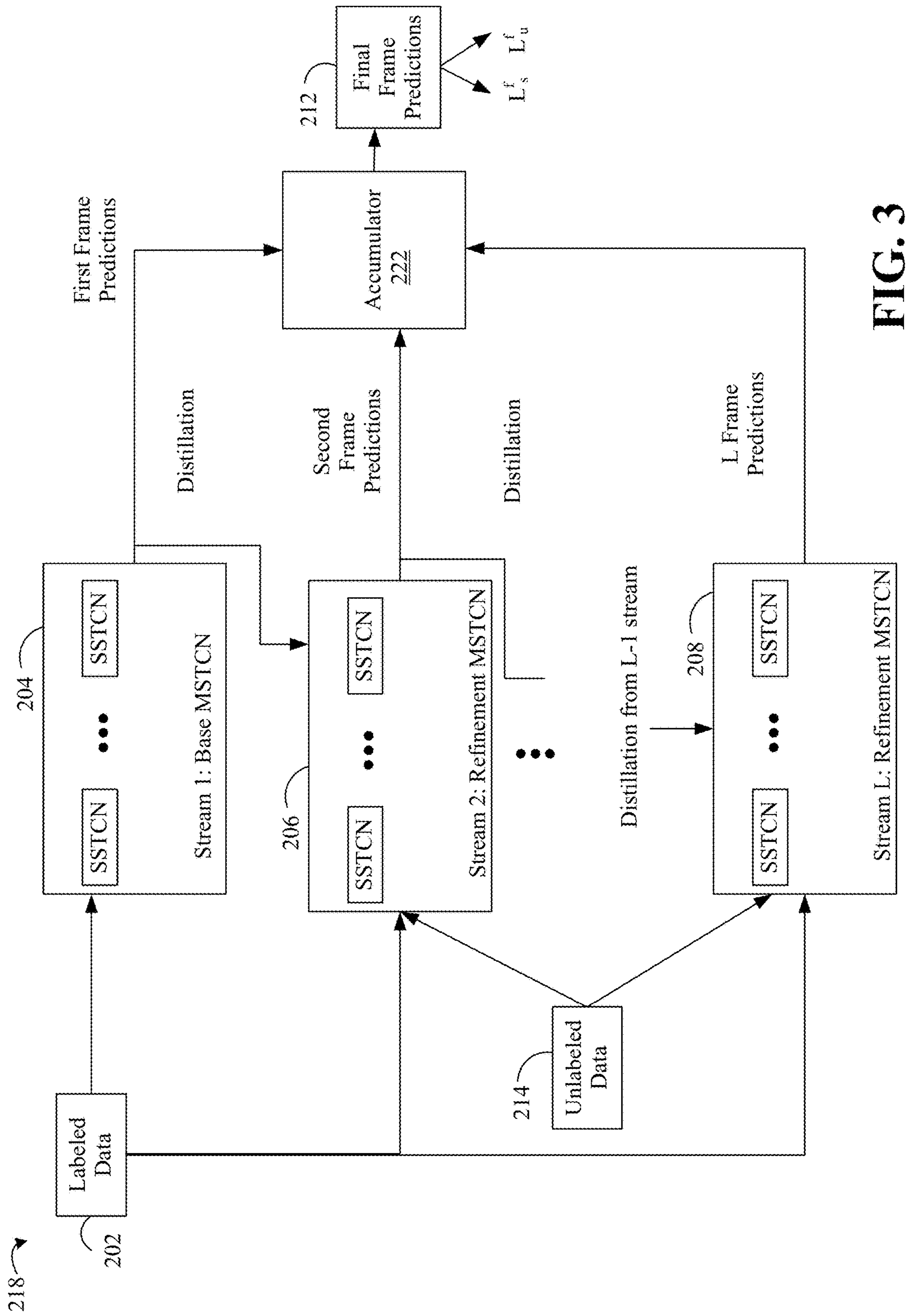
FIG. 3 is an example of multi-stream temporal convolution networks according to an embodiment.

FIG. 3 illustrates a multi-stream temporal convolution networks architecture 218. The multi-stream temporal convolution networks architecture 218 may implement one or more aspects of the embodiments described herein, for example, the semi-supervised machine learning architecture 100 (FIG. 1) and/or method 300 (FIG. 2).

The multi-stream temporal convolution networks architecture 218 includes different streaming models that each include Separable Spatial Temporal Convolution Network (SSTCN). The multi-stream temporal convolution networks architecture 218 may be readily substituted for the multi-stream temporal convolution networks 104 (FIG. 1) and/or implemented in conjunction with method 300 (FIG. 2). In detail, a first stream 204 is a base MSTCN model or MSTCN++ model. The first stream 204 is trained only on labeled data. A distillation may be a transfer of knowledge from one stream to another stream. The distillation of the first stream 204 is provided to the second stream 206. The second stream 206 may be initialized (e.g., set initial weights, biases, activation functions, constants, etc.) based on the distillation from the first stream 204 and is trained based on the unlabeled data 214 and the labeled data. Each of the streams of the multi-stream temporal convolution networks architecture 218, except first stream 204, receives a corresponding distillation from a previous stream and is initialized based on the corresponding distillation.

Each stream in the multi-stream temporal convolution networks architecture 218 is an independent equal-sized MSTCN++ (e.g., a temporal segmentation model) with a different initialization. The first stream 204 (e.g., base-stream MSTCN model or third temporal segmentation machine learning model), is trained only on the cleaned and annotated data of the labeled data 202. Thus, the first stream 204 is uncorrupted due to the errors of label predictions on unlabeled data 214. The first stream 204 has lesser generalization capability than other streams of the multi-stream temporal convolution networks architecture 218 due to a small percentage of training data. Examples distill the prediction of the encoding stage of the second stream 206 based on the distillation of the first stream 204. This distillation process is repeated multiple times between different streams of the multi-stream temporal convolution networks architecture 218.

In contrast to the first stream 204 (the base stream), the latter streams of the multi-stream temporal convolution networks architecture 218 are trained both with labeled data 202 and unlabeled data 214 with soft labels being eventually generated. The loss $L^f_s$ and Loss $L^f_u$ denote the cross-entropy losses over labeled and unlabeled data 202, 214, respectively and may be readily incorporated into the multi-stream temporal convolution networks architecture 218. The second stream 206 (e.g., a first temporal segmentation machine learning model) and L stream 208 (e.g., a second temporal segmentation machine learning model) may thus be updated on both the loss $L^f_s$ and Loss $L^f_u$ which may collectively be referred to as a second loss. Thus the second stream 206 and L stream 208 are trained based on the final frame predictions 212 and soft labels generated as described herein.

A MSTCN model may be noisy, mainly where action transitions occur. This is because action characteristics at the transitions are different from the characteristics in the middle of the action duration, resulting in a smooth and subjective boundary. In order to better distinguish between the action transitions, examples accumulate the predictions generated by the streams of the multi-stream temporal convolution networks architecture 218 to provide robustness in predicting such transitions in an accumulator 222. The accumulation of predictions enhances prediction consistency, further boosting the performance. Final frame predictions 212 are generated based on the predictions accumulated in the accumulator 222. For example, a prediction for a frame that is output most frequently from the streams may be selected as a final frame prediction for the frame, although in some examples multiple predictions may be selected for the frame also.

Figure 4:
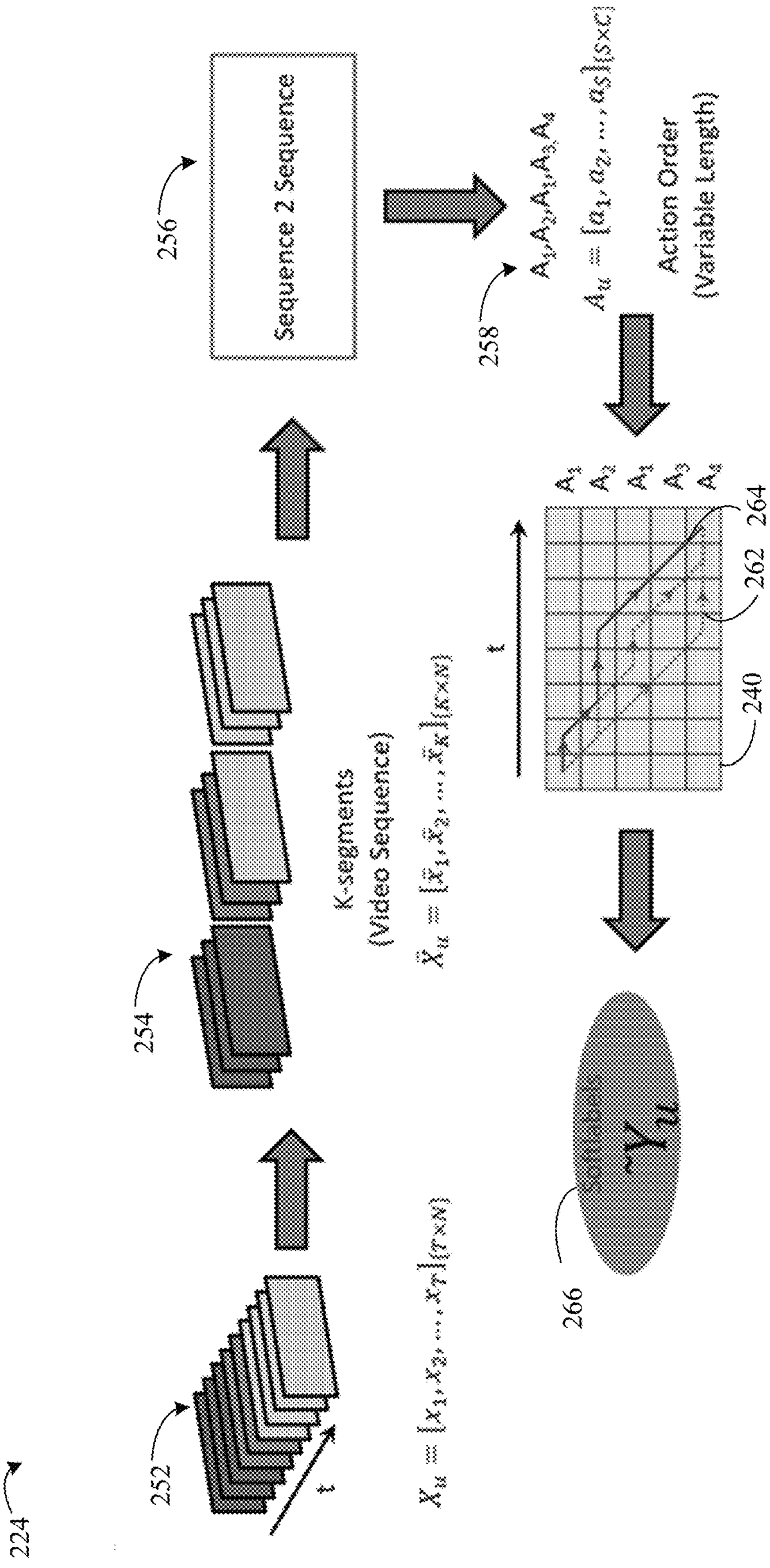
FIG. 4 is an example of a training architecture according to an embodiment.

Turning now to FIG. 4, a training architecture 224 is illustrated. The training architecture 224 may implement one or more aspects of the embodiments described herein, for example, the semi-supervised machine learning architecture 100 (FIG. 1), method 300 (FIG. 2) and/or multi-stream temporal convolution networks architecture 218 (FIG. 3). A small amount of annotated training data contains frame-wise action labels for a video sequence. Examples may also represent this data as the sequence of action steps performed in the video. So, for any video sequence, examples may learn the sequence of action steps taken to complete the task. Initially, a plurality of frames 252 are divided into K-segments. The parameter K is adjustable and depends on the task. For example, each task may be associated with a different number of maximum actions (e.g., each task is stored in a lookup table in association with a number of actions). The total number of actions may correspond to K.

In some examples, the segments may be identified based on predictions associated with the frames. That is, frames with a similar prediction (e.g., all frames predicted to be a first action) are grouped together as a segment. For example, the length of the video sequences may vary. Thus, examples Maxpool the class-wise frame predictions temporally into non-overlapping K video fragments. The K fragments of temporally ordered max pool predictions form the input to the sequence-to-sequence model 256. The value of K may be identified empirically (e.g., based on experience).

The sequence-to-sequence model 256 generates a sequence of action steps based on the frame-wise predictions of the segments 254. The output of the sequence-to-sequence model 256 is the sequence of the action steps taken to perform the task in the video. The sequence-to-sequence model 256 generates an order of actions 258 for unlabeled data using this sequence-to-sequence model 256 and the frame predictions (e.g., from a multi-stream MSTCN++ for unlabeled data). The sequence-to-sequence model 256 may be trained based on annotated data of input data comprising the frames 252 (e.g., around 30%), and based on soft labels 266 that will be generated.

To generate the soft labels 266, examples predict the sequence of actions performed on the unannotated video sequence, as shown in graph 240. That is, examples use the expected action sequence (e.g., the ordered list of actions) to generate frame-wise soft labels by temporal alignment based on the prediction logits output by a multi-stream MSTCN++ model. For example, examples may employ a DTW to perform temporal alignment. The temporal alignment is performed only on the unlabeled or un-annotated video sequences as it is not necessary to do so on the labeled data. In this example, the X-axis (horizontal axis) represents the different frames 252, while the Y-axis (vertical line) represents the order of actions A1, A2, A1, A3, A4. Each frame may be mapped to one or more actions based on the predictions associated with the frame. As noted above, the prediction may include probabilities a certain actions occurring in the frame, As noted above, each respective frame of the frames 252 may be mapped to a most probable action by the prediction associated with the respective frame, and/or multiple actions that are each deemed to be probable or above a certain threshold based on the prediction associated with the respective frame (e.g., a frame may have multiple solutions).

In some examples, sets of the frames 252 may be mapped to different actions. For example the segments 254 may be mapped to the different actions. Notably, the segments 254 are mapped in such a way that continuous frames correspond to the same or similar actions. The graph 240 includes different pathways based on the different probabilities of the predictions. For example, a low cost line 262 maps two different pathways illustrating the different probabilities for the frames 252 and/or segments 254 generated by different streams which are represented by the prediction for the different frames 252 and/or segments 254.

Subsequently, embodiments generate soft labels 266 and the available annotated frame-wise labels to train streams (e.g., all streams except the first stream) of the multi-stream MSTCN++. In this example, the high cost line 264 is generated with a high-cost DTW function and the low cost line 262 is generated with a low cost DTW function.

Figure 5:
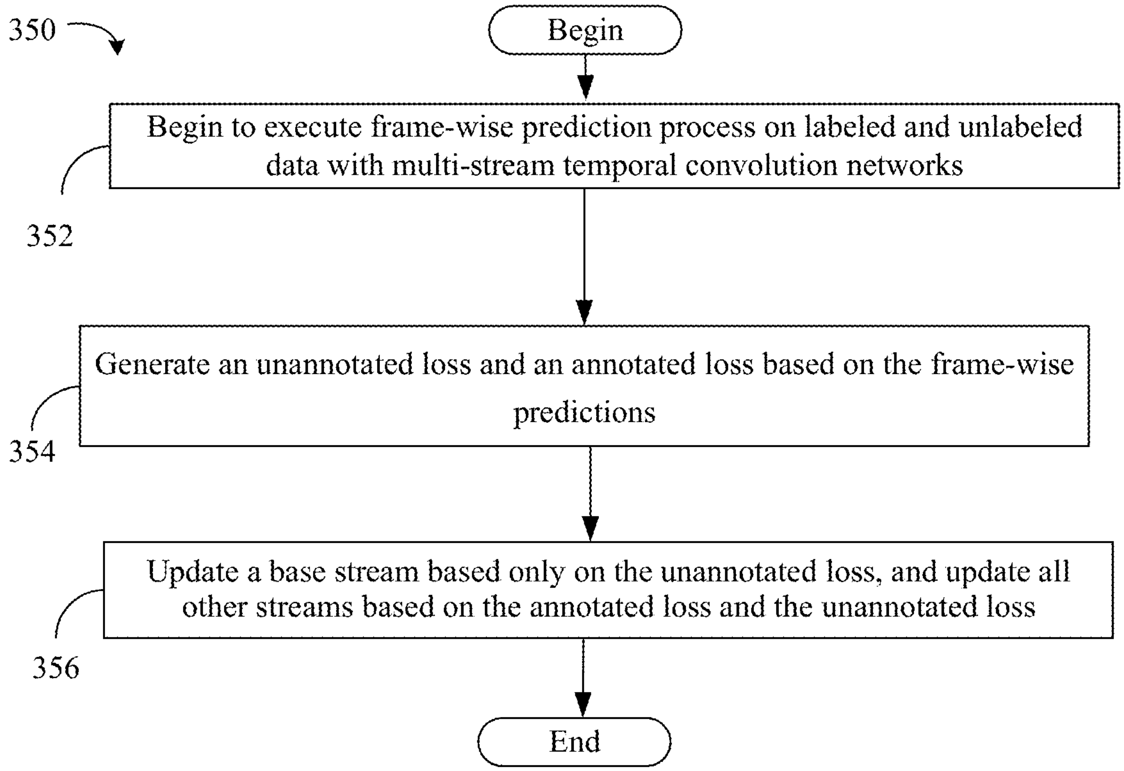
FIG. 5 is a flowchart of an example of a method of generating losses and updating streams based on the losses according to an embodiment.

FIG. 5 shows a method 350 of generating losses and updating streams based on the losses. The method 350 may generally be implemented with other embodiments described herein, for example, the semi-supervised machine learning architecture 100 (FIG. 1), method 300 (FIG. 2), multi-stream temporal convolution networks architecture 218 (FIG. 3) and/or a training architecture 224 (FIG. 4) already discussed.

The method 420 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated processing block 352 begins to execute frame-wise prediction process on labeled and unlabeled data with multi-stream temporal convolution networks. Illustrated processing block 354 generates an unannotated loss and an annotated loss based on the frame-wise predictions. Illustrated processing block 356 updates a base stream based only on the unannotated loss, and updates all other streams based on the annotated loss and the unannotated loss. Thus, the base stream is not subject to errors introduced through unlabeled data, but lacks some level of generalization exhibited by the other streams.

FIG. 5 shows a method 360 of generating losses and updating streams based on the losses. The method 360 may generally be implemented with other embodiments described herein, for example, the semi-supervised machine learning architecture 100 (FIG. 1), method 300 (FIG. 2), multi-stream temporal convolution networks architecture 218 (FIG. 3), a training architecture 224 (FIG. 4) and/or method 350 (FIG. 5) already discussed.

Figure 6:
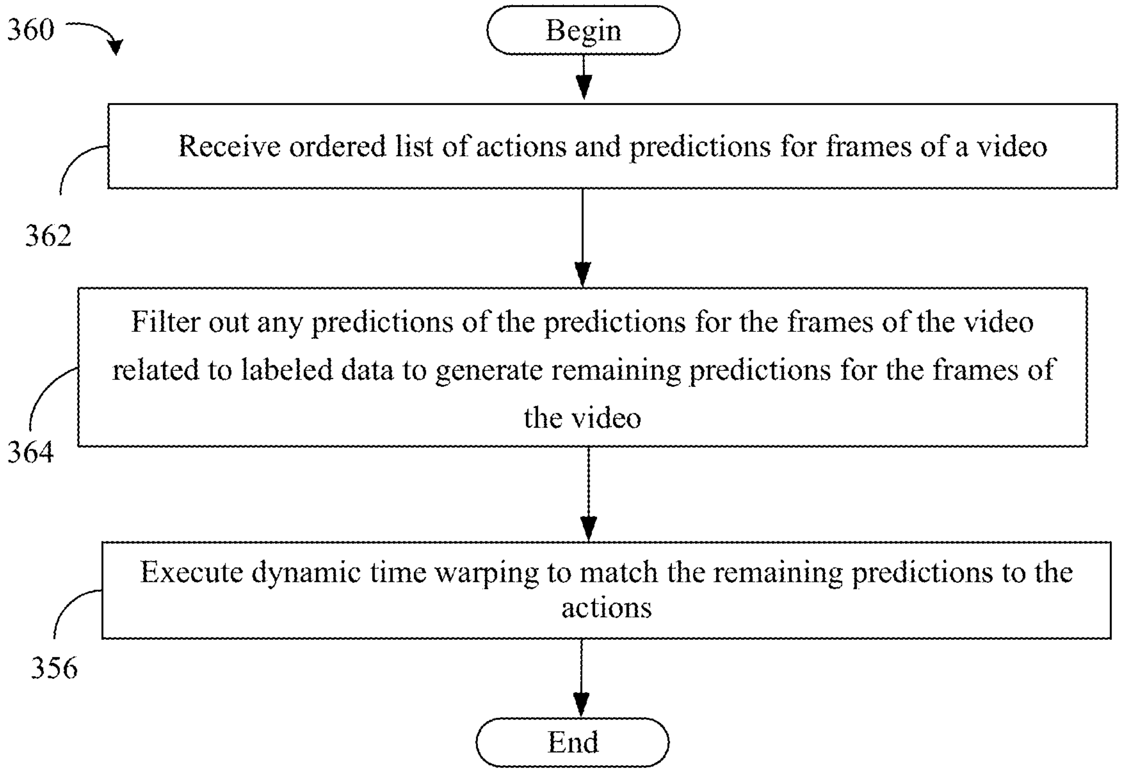
FIG. 6 is a flowchart of an example of a method of matching frame-wise prediction to actions according to an embodiment.

FIG. 6 shows a method 360 of matching frame-wise prediction to actions. The method 360 may generally be implemented with other embodiments described herein, for example, the semi-supervised machine learning architecture 100 (FIG. 1), method 300 (FIG. 2), multi-stream temporal convolution networks architecture 218 (FIG. 3), training architecture 224 (FIG. 4) and/or method 350 (FIG. 5) already discussed.

The method 360 may be implemented in one or more modules as a set of logic instructions stored in a machine- or computer-readable storage medium such as RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated processing block 362 receives an ordered list of actions and predictions for frames of a video. Illustrated processing block 364 filters out any predictions of the predictions for the frames of the video related to labeled data to generate remaining predictions for the frames of the video. Illustrated processing block 366 executes dynamic time warping to match the remaining predictions to the actions.

Figure 7:
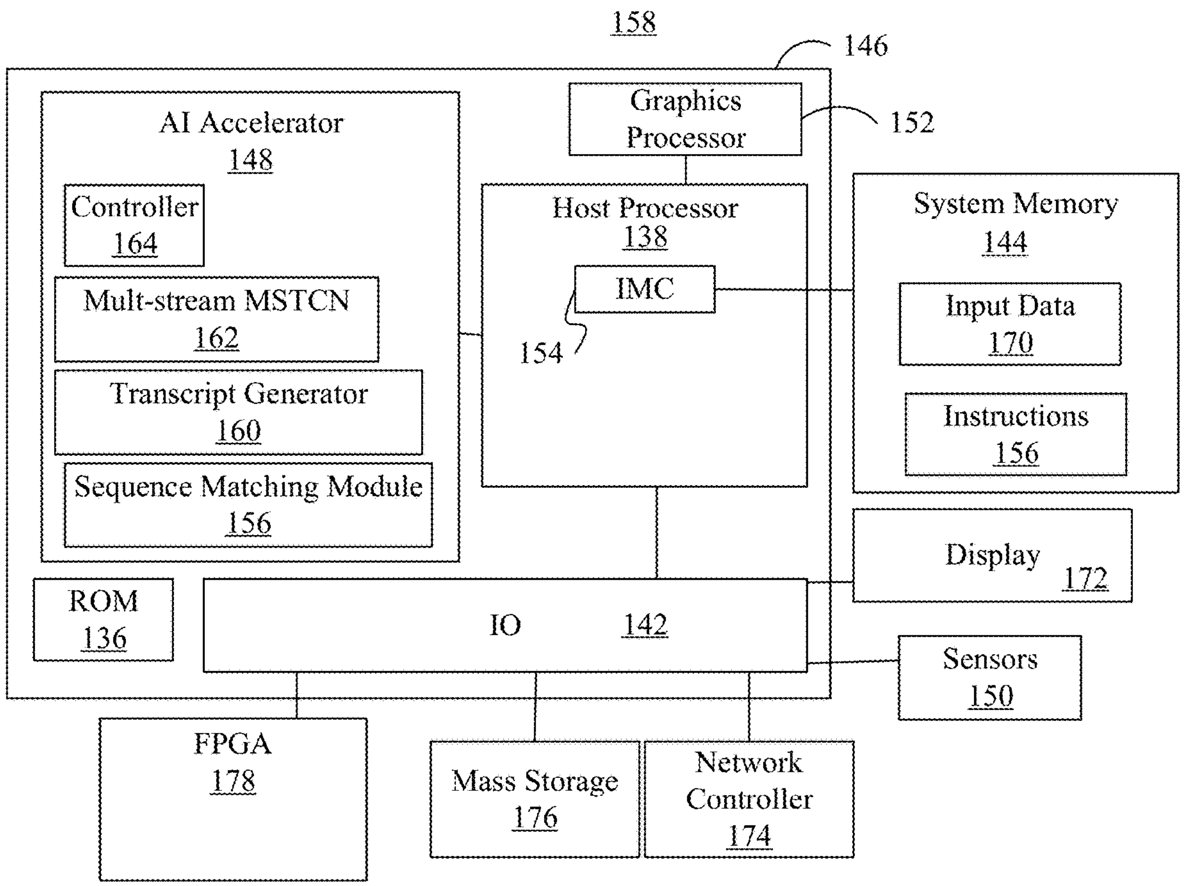
FIG. 7 is a diagram of an example of an efficiency-enhanced computing system according to an embodiment.

Turning now to FIG. 7, a training-enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot, manufacturing robot, autonomous vehicle, industrial robot, etc.), edge device (e.g., mobile phone, desktop, etc.) etc., or any combination thereof. In the illustrated example, the computing system 158 includes a host processor 138 (e.g., CPU) having an integrated memory controller (IMC) 154 that is coupled to a system memory 144.

The illustrated computing system 158 also includes an input output (IO) module 142 implemented together with the host processor 138, the graphics processor 152 (e.g., GPU), ROM 136, and AI accelerator 148 on a semiconductor die 146 as a system on chip (SoC). The illustrated IO module 142 communicates with, for example, a display 172 (e.g., touch screen, liquid crystal display/LCD, light emitting diode/LED display), a network controller 174 (e.g., wired and/or wireless), FPGA 178 and mass storage 176 (e.g., hard disk drive/HDD, optical disk, solid state drive/SSD, flash memory). The IO module 142 also communicates with sensors 150 (e.g., video sensors, audio sensors, proximity sensors, heat sensors, etc.). The sensors 150 may provide input data 170 to the AI accelerator 148 to facilitate training according to embodiments as described herein. The SoC 146 may further include processors (not shown) and/or the AI accelerator 148 dedicated to artificial intelligence (AI) and/or neural network (NN) processing. For example, the system SoC 146 may include vision processing units (VPUs,) and/or other AI/NN-specific processors such as the AI accelerator 148, etc. In some embodiments, any aspect of the embodiments described herein may be implemented in the processors, such as the graphics processor 152 and/or the host processor 138, and in the accelerators dedicated to AI and/or NN processing such as AI accelerator 148 or other devices such as the FPGA 178.

The graphics processor 152, AI accelerator 148 and/or the host processor 138 may execute instructions 156 retrieved from the system memory 144 (e.g., a dynamic random-access memory) and/or the mass storage 176 to implement aspects as described herein. For example, a controller 164 of the AI accelerator 148 may execute a training process based on input data 170 (e.g., video data). That is, the controller 164 identifies, with the multi-stream MSTCN 162, predictions for the input data 170 (e.g., comprising a small amount of labeled data and a significant amount of unlabeled data). The controller 164 then identifies, with the transcript generator 160, segments of the input data 170 and action that occur in the segments based on the predictions. The controller 164 then executes, with the sequence matching module 156, DTW to match the actions to the input data.

In some examples, when the instructions 156 are executed, the computing system 158 may implement one or more aspects of the embodiments described herein. For example, the computing system 158 may implement one or more aspects of the embodiments described herein, for example, the semi-supervised machine learning architecture 100 (FIG. 1), method 300 (FIG. 2), multi-stream temporal convolution networks architecture 218 (FIG. 3), a training architecture 224 (FIG. 4), method 350 (FIG. 5) and/or method 360 (FIG. 6) already discussed. The illustrated computing system 158 is therefore considered to be accuracy and efficiency-enhanced at least to the extent that the computing system 158 may train over a significant amount of unlabeled data.

Figure 8:
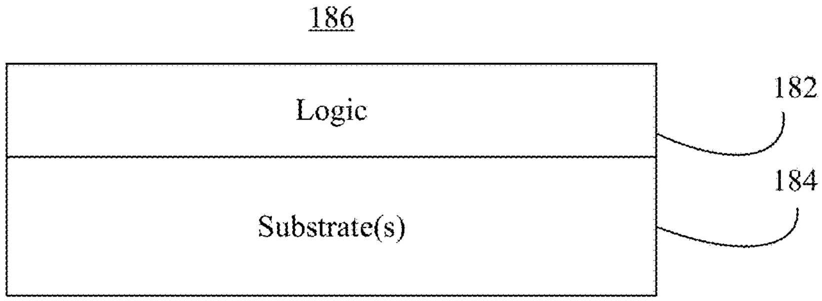
FIG. 8 is an illustration of an example of a semiconductor apparatus according to an embodiment.

FIG. 8 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein. For example, the apparatus 186 may generally implement the embodiments described herein, for example, the semi-supervised machine learning architecture 100 (FIG. 1), method 300 (FIG. 2), multi-stream temporal convolution networks architecture 218 (FIG. 3), a training architecture 224 (FIG. 4), method 350 (FIG. 5) and/or method 360 (FIG. 6). The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 9:
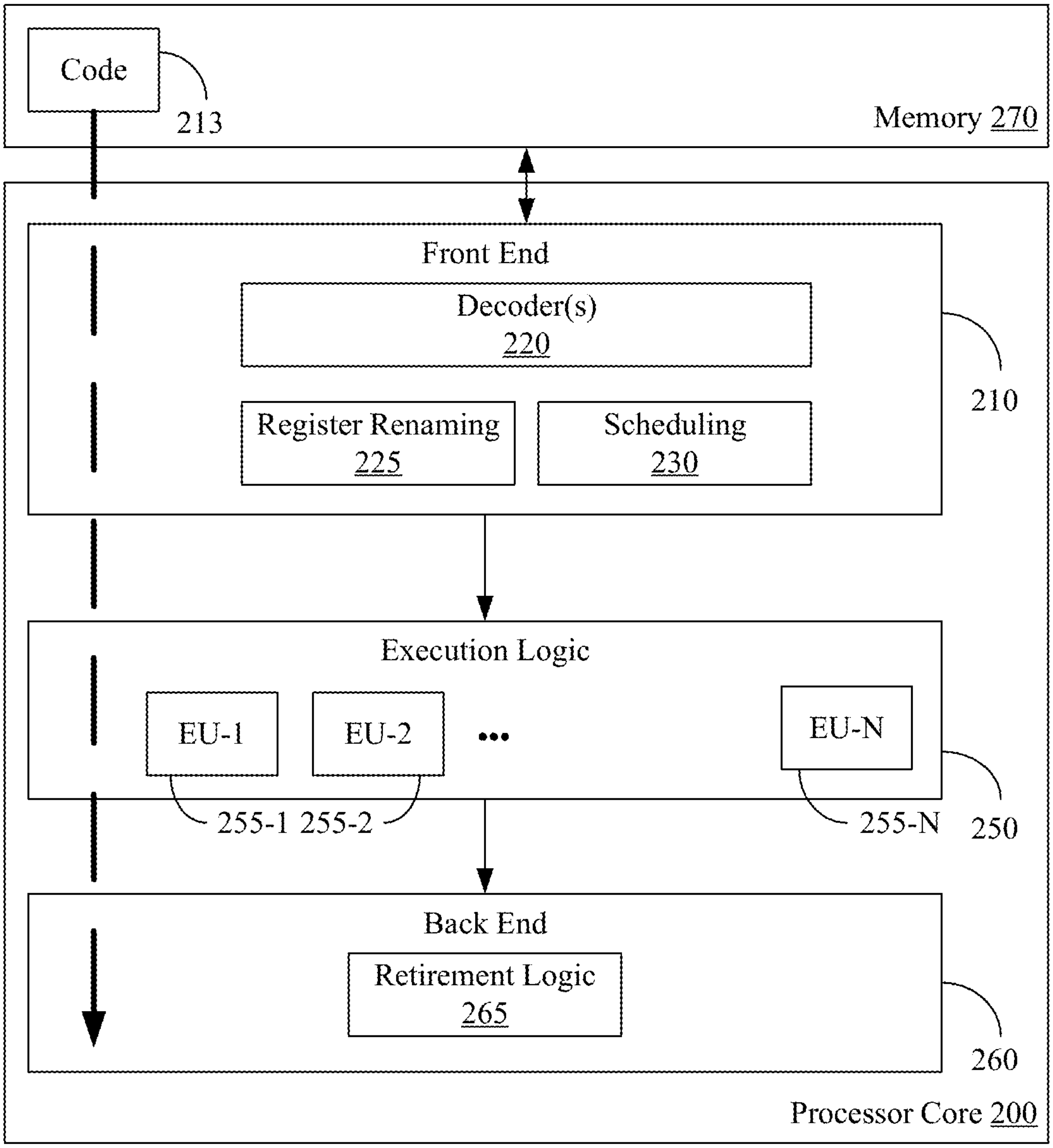
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the semi-supervised machine learning architecture 100 (FIG. 1), method 300 (FIG. 2), multi-stream temporal convolution networks architecture 218 (FIG. 3), a training architecture 224 (FIG. 4), method 350 (FIG. 5) and/or method 360 (FIG. 6) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include several execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back-end logic 226 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
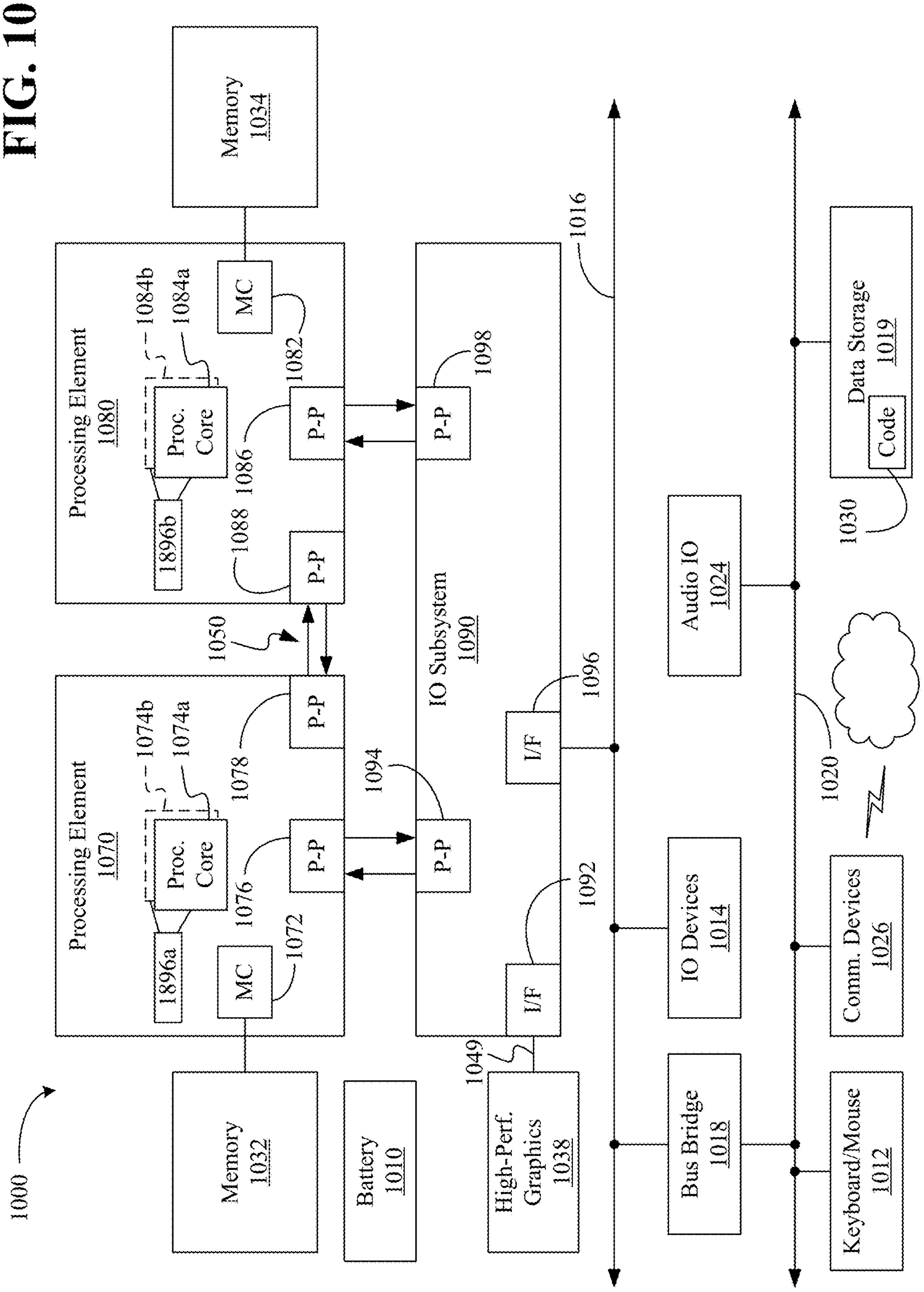
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood any or all the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner like that discussed above in connection with FIG. 9.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the semi-supervised machine learning architecture 100 (FIG. 1), method 300 (FIG. 2), multi-stream temporal convolution networks architecture 218 (FIG. 3), a training architecture 224 (FIG. 4), method 350 (FIG. 5) and/or method 360 (FIG. 6) already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a computing system comprising a data storage to store a first plurality of frames associated with a video, wherein the first plurality of frames is associated with unlabeled data, and a controller implemented in one or more of configurable logic or fixed-functionality logic, wherein the controller is to generate final frame predictions for the first plurality of frames, predict an ordered list of actions for the first plurality of frames based on the final frame predictions, and temporally align the ordered list of actions to the final frame predictions to generate labels.

Example 2 includes the computing system of Example 1, wherein the controller is further to generate a first loss based on the final frame predictions, generate a second loss based on the ordered list of actions, update a first machine learning model based on the first loss, wherein the first machine learning model is to generate the final frame predictions, and update a second machine learning model based on the second loss, wherein the second machine learning model is to predict the ordered list.

Example 3 includes the computing system of Example 2, wherein the first machine learning model includes a plurality of temporal segmentation machine learning models, and the controller is further to generate, with a first temporal segmentation machine learning model of the plurality of temporal segmentation machine learning models, first frame predictions based on the first plurality of frames, and generate, with a second temporal segmentation machine learning model of the plurality of temporal segmentation machine learning models, second frame predictions based on the first plurality of frames, and wherein to generate the final frame predictions, the controller is to accumulate the first frame predictions and the second frame predictions.

Example 4 includes the computing system of Example 3, wherein the controller is further to train the first and second temporal segmentation machine learning models based on the labels and the final frame predictions, and bypass a third temporal segmentation machine learning model of the plurality of temporal segmentation machine learning models from being trained based on the labels and the final frame predictions.

Example 5 includes the computing system of any one of Examples 1 to 4, wherein to temporally align the ordered list of actions to the final frame predictions, the controller is to execute a dynamic time warping process.

Example 6 includes the computing system of any one of Examples 1 to 5, wherein a second plurality of frames of the video are associated with labeled data, wherein to temporally align the ordered list of actions to the final frame predictions, the controller is to temporally align a first subset of actions from the ordered list of actions associated with the first plurality of frames and a first subset of the final frame predictions associated with the first plurality of frames, and bypass a second subset of actions from the ordered list of actions associated with the second plurality of frames and a second subset of the final frame predictions associated with the second plurality of frames.

Example 7 includes a semiconductor apparatus, the semiconductor apparatus comprising one or more substrates, and logic coupled to the one or more substrates, wherein the logic is implemented in one or more of configurable logic or fixed-functionality logic, the logic coupled to the one or more substrates to generate final frame predictions for a first plurality of frames of a video, wherein the first plurality of frames is associated with unlabeled data, predict an ordered list of actions for the first plurality of frames based on the final frame predictions, and temporally align the ordered list of actions to the final frame predictions to generate labels.

Example 8 includes the apparatus of Example 7, wherein the logic coupled to the one or more substrates is further to generate a first loss based on the final frame predictions, generate a second loss based on the ordered list of actions, update a first machine learning model based on the first loss, wherein the first machine learning model is to generate the final frame predictions, and update a second machine learning model based on the second loss, wherein the second machine learning model is to predict the ordered list.

Example 9 includes the apparatus of Example 8, wherein the first machine learning model includes a plurality of temporal segmentation machine learning models, and the logic coupled to the one or more substrates is further to generate, with a first temporal segmentation machine learning model of the plurality of temporal segmentation machine learning models, first frame predictions based on the first plurality of frames, and generate, with a second temporal segmentation machine learning model of the plurality of temporal segmentation machine learning models, second frame predictions based on the first plurality of frames, and wherein to generate the final frame predictions, wherein the logic coupled to the one or more substrates is to accumulate the first frame predictions and the second frame predictions.

Example 10 includes the apparatus of Example 9, wherein the logic coupled to the one or more substrates is further to train the first and second temporal segmentation machine learning models based on the labels and the final frame predictions, and bypass a third temporal segmentation machine learning model of the plurality of temporal segmentation machine learning models from being trained based on the labels and the final frame predictions.

Example 11 includes the apparatus of any one of Examples 7 to 10, wherein to temporally align the ordered list of actions to the final frame predictions, the logic coupled to the one or more substrates is further to execute a dynamic time warping process.

Example 12 includes the apparatus of any one of Examples 7 to 11, wherein a second plurality of frames of the video are associated with labeled data, wherein to temporally align the ordered list of actions to the final frame predictions, the logic coupled to the one or more substrates is to temporally align a first subset of actions from the ordered list of actions associated with the first plurality of frames and a first subset of the final frame predictions associated with the first plurality of frames, and bypass a second subset of actions from the ordered list of actions associated with the second plurality of frames and a second subset of the final frame predictions associated with the second plurality of frames.

Example 13 includes the apparatus of any one of Examples 7 to 12, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to generate final frame predictions for a first plurality of frames of a video, wherein the first plurality of frames is associated with unlabeled data, predict an ordered list of actions for the first plurality of frames based on the final frame predictions, and temporally align the ordered list of actions to the final frame predictions to generate labels.

Example 15 includes the at least one computer readable storage medium of Example 14, wherein the instructions, when executed, further cause the computing system to generate a first loss based on the final frame predictions, generate a second loss based on the ordered list of actions, update a first machine learning model based on the first loss, wherein the first machine learning model is to generate the final frame predictions, and update a second machine learning model based on the second loss, wherein the second machine learning model is to predict the ordered list.

Example 16 includes the at least one computer readable storage medium of Example 15, wherein the first machine learning model includes a plurality of temporal segmentation machine learning models, wherein the instructions, when executed, further cause the computing system to generate, with a first temporal segmentation machine learning model of the plurality of temporal segmentation machine learning models, first frame predictions based on the first plurality of frames, and generate, with a second temporal segmentation machine learning model of the plurality of temporal segmentation machine learning models, second frame predictions based on the first plurality of frames, and wherein to generate the final frame predictions, the instructions, when executed, further cause the computing system to accumulate the first frame predictions and the second frame predictions.

Example 17 includes the at least one computer readable storage medium of Example 16, wherein the instructions, when executed, further cause the computing system to train the first and second temporal segmentation machine learning models based on the labels and the final frame predictions, and bypass a third temporal segmentation machine learning model of the plurality of temporal segmentation machine learning models from being trained based on the labels and the final frame predictions.

Example 18 includes the at least one computer readable storage medium of any one of Examples 14 to 17, wherein to temporally align the ordered list of actions to the final frame predictions, the instructions, when executed, further cause the computing system to execute a dynamic time warping process.

Example 19 includes the at least one computer readable storage medium of any one of Examples 14 to 18, wherein a second plurality of frames of the video are associated with labeled data, wherein to temporally align the ordered list of actions to the final frame predictions, the instructions, when executed, further cause the computing system to temporally align a first subset of actions from the ordered list of actions associated with the first plurality of frames and a first subset of the final frame predictions associated with the first plurality of frames, and bypass a second subset of actions from the ordered list of actions associated with the second plurality of frames and a second subset of the final frame predictions associated with the second plurality of frames.

Example 20 includes a method comprising generating final frame predictions for a first plurality of frames of a video, wherein the first plurality of frames is associated with unlabeled data, predicting an ordered list of actions for the first plurality of frames based on the final frame predictions, and temporally aligning the ordered list of actions to the final frame predictions to generate labels.

Example 21 includes the method of Example 20, further comprising generating a first loss based on the final frame predictions, generating a second loss based on the ordered list of actions, updating a first machine learning model based on the first loss, wherein the first machine learning model is to generate the final frame predictions, and updating a second machine learning model based on the second loss, wherein the second machine learning model is to predict the ordered list.

Example 22 includes the method of Example 21, wherein the first machine learning model includes a plurality of temporal segmentation machine learning models, and the method further comprises generating, with a first temporal segmentation machine learning model of the plurality of temporal segmentation machine learning models, first frame predictions based on the first plurality of frames, and generating, with a second temporal segmentation machine learning model of the plurality of temporal segmentation machine learning models, second frame predictions based on the first plurality of frames, and wherein the generating the final frame predictions includes accumulating the first frame predictions and the second frame predictions.

Example 23 includes the method of Example 22, wherein the method further comprises training the first and second temporal segmentation machine learning models based on the labels and the final frame predictions, and bypassing a third temporal segmentation machine learning model of the plurality of temporal segmentation machine learning models from being trained based on the labels and the final frame predictions.

Example 24 includes the method of any one of Examples 20 to 23, wherein the temporally aligning includes executing a dynamic time warping process.

Example 25 includes the method of any one of Examples 20 to 24, wherein a second plurality of frames of the video are associated with labeled data, the temporally aligning includes temporally aligning a first subset of actions from the ordered list of actions associated with the first plurality of frames and a first subset of the final frame predictions associated with the first plurality of frames, and bypassing a second subset of actions from the ordered list of actions associated with the second plurality of frames and a second subset of the final frame predictions associated with the second plurality of frames.

Example 26 includes a semiconductor apparatus, the semiconductor apparatus comprising means for generating final frame predictions for a first plurality of frames of a video, wherein the first plurality of frames is associated with unlabeled data, means for predicting an ordered list of actions for the first plurality of frames based on the final frame predictions, and means for temporally aligning the ordered list of actions to the final frame predictions to generate labels.

Example 27 includes the apparatus of Example 26, further comprising means for generating a first loss based on the final frame predictions, means for generating a second loss based on the ordered list of actions, means for updating a first machine learning model based on the first loss, wherein the first machine learning model is to generate the final frame predictions, and means for updating a second machine learning model based on the second loss, wherein the second machine learning model is to predict the ordered list.

Example 28 includes the apparatus of Example 27, wherein the first machine learning model includes a plurality of temporal segmentation machine learning models, and the apparatus further comprises means for generating, with a first temporal segmentation machine learning model of the plurality of temporal segmentation machine learning models, first frame predictions based on the first plurality of frames, and means for generating, with a second temporal segmentation machine learning model of the plurality of temporal segmentation machine learning models, second frame predictions based on the first plurality of frames, and wherein the generating the final frame predictions includes accumulating the first frame predictions and the second frame predictions.

Example 29 includes the apparatus of Example 28, wherein the apparatus further comprises means for training the first and second temporal segmentation machine learning models based on the labels and the final frame predictions, and means for bypassing a third temporal segmentation machine learning model of the plurality of temporal segmentation machine learning models from being trained based on the labels and the final frame predictions.

Example 30 includes the apparatus of any one of Examples 26 to 29, wherein the means for temporally aligning includes means for executing a dynamic time warping process.

Example 31 includes the apparatus of any one of Examples 26 to 30, wherein a second plurality of frames of the video are associated with labeled data, the means for the temporally aligning includes means for temporally aligning a first subset of actions from the ordered list of actions associated with the first plurality of frames and a first subset of the final frame predictions associated with the first plurality of frames, and means for bypassing a second subset of actions from the ordered list of actions associated with the second plurality of frames and a second subset of the final frame predictions associated with the second plurality of frames.

Embodiments are applicable for use with all types of semiconductor integrated circuit ("IC") chips. Examples of these IC chips include but are not limited to processors, controllers, chip set components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical, or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
- a data storage to store a first plurality of frames associated with a video, wherein the first plurality of frames is associated with unlabeled data; and
- a hardware accelerator including a controller implemented in one or more of configurable logic or fixed-functionality logic, wherein the controller is to:
  - generate final frame predictions for the first plurality of frames,
  - predict an ordered list of actions for the first plurality of frames based on the final frame predictions, and
  - temporally align the ordered list of actions to the final frame predictions to generate labels.

2. The computing system of claim 1, wherein the controller is further to:
- generate a first loss based on the final frame predictions,
- generate a second loss based on the ordered list of actions,
- update a first machine learning model based on the first loss, wherein the first machine learning model is to generate the final frame predictions, and
- update a second machine learning model based on the second loss, wherein the second machine learning model is to predict the ordered list.

3. The computing system of claim 2, wherein the first machine learning model includes a plurality of temporal segmentation machine learning models, and the controller is further to:
- generate, with a first temporal segmentation machine learning model of the plurality of temporal segmentation machine learning models, first frame predictions based on the first plurality of frames, and
- generate, with a second temporal segmentation machine learning model of the plurality of temporal segmentation machine learning models, second frame predictions based on the first plurality of frames; and
- wherein to generate the final frame predictions, the controller is to accumulate the first frame predictions and the second frame predictions.

4. The computing system of claim 3, wherein the controller is further to:
- train the first and second temporal segmentation machine learning models based on the labels and the final frame predictions, and
- bypass a third temporal segmentation machine learning model of the plurality of temporal segmentation machine learning models from being trained based on the labels and the final frame predictions.

5. The computing system of claim 1, wherein to temporally align the ordered list of actions to the final frame predictions, the controller is to execute a dynamic time warping process.

6. The computing system of claim 1, wherein a second plurality of frames of the video are associated with labeled data, and wherein to temporally align the ordered list of actions to the final frame predictions, the controller is to:
- temporally align a first subset of actions from the ordered list of actions associated with the first plurality of frames and a first subset of the final frame predictions associated with the first plurality of frames, and
- bypass a second subset of actions from the ordered list of actions associated with the second plurality of frames and a second subset of the final frame predictions associated with the second plurality of frames.

7. A semiconductor apparatus, the semiconductor apparatus comprising:
- one or more substrates; and
- logic coupled to the one or more substrates, wherein the logic is implemented in one or more of configurable logic or fixed-functionality logic of a hardware accelerator, the logic coupled to the one or more substrates to:
  - generate final frame predictions for a first plurality of frames of a video, wherein the first plurality of frames is associated with unlabeled data;
  - predict an ordered list of actions for the first plurality of frames based on the final frame predictions; and
  - temporally align the ordered list of actions to the final frame predictions to generate labels.

8. The apparatus of claim 7, wherein the logic coupled to the one or more substrates is further to:
- generate a first loss based on the final frame predictions;
- generate a second loss based on the ordered list of actions;
- update a first machine learning model based on the first loss, wherein the first machine learning model is to generate the final frame predictions; and
- update a second machine learning model based on the second loss, wherein the second machine learning model is to predict the ordered list.

9. The apparatus of claim 8, wherein the first machine learning model includes a plurality of temporal segmentation machine learning models, and the logic coupled to the one or more substrates is further to:
- generate, with a first temporal segmentation machine learning model of the plurality of temporal segmentation machine learning models, first frame predictions based on the first plurality of frames; and
- generate, with a second temporal segmentation machine learning model of the plurality of temporal segmentation machine learning models, second frame predictions based on the first plurality of frames; and wherein to generate the final frame predictions, wherein the logic coupled to the one or more substrates is to accumulate the first frame predictions and the second frame predictions.

10. The apparatus of claim 9, wherein the logic coupled to the one or more substrates is further to:

train the first and second temporal segmentation machine learning models based on the labels and the final frame predictions; and bypass a third temporal segmentation machine learning model of the plurality of temporal segmentation machine learning models from being trained based on the labels and the final frame predictions.

11. The apparatus of claim 7, wherein to temporally align the ordered list of actions to the final frame predictions, the logic coupled to the one or more substrates is further to execute a dynamic time warping process.

12. The apparatus of claim 7, wherein a second plurality of frames of the video are associated with labeled data, wherein to temporally align the ordered list of actions to the final frame predictions, the logic coupled to the one or more substrates is to:

temporally align a first subset of actions from the ordered list of actions associated with the first plurality of frames and a first subset of the final frame predictions associated with the first plurality of frames, and bypass a second subset of actions from the ordered list of actions associated with the second plurality of frames and a second subset of the final frame predictions associated with the second plurality of frames.

13. The apparatus of claim 7, wherein the logic coupled to the one or more substrates includes transistor channel regions that are positioned within the one or more substrates.

14. At least one non-transitory computer readable storage medium comprising a set of executable program instructions, which when executed by a computing system, cause the computing system to:

generate final frame predictions for a first plurality of frames of a video, wherein the first plurality of frames is associated with unlabeled data;

predict an ordered list of actions for the first plurality of frames based on the final frame predictions; and temporally align the ordered list of actions to the final frame predictions to generate labels.

15. The at least one non-transitory computer readable storage medium of claim 14, wherein the instructions, when executed, further cause the computing system to:

generate a first loss based on the final frame predictions;

generate a second loss based on the ordered list of actions;

update a first machine learning model based on the first loss, wherein the first machine learning model is to generate the final frame predictions; and update a second machine learning model based on the second loss, wherein the second machine learning model is to predict the ordered list.

16. The at least one non-transitory computer readable storage medium of claim 15, wherein the first machine learning model includes a plurality of temporal segmentation machine learning models, wherein the instructions, when executed, further cause the computing system to:

generate, with a first temporal segmentation machine learning model of the plurality of temporal segmentation machine learning models, first frame predictions based on the first plurality of frames; and generate, with a second temporal segmentation machine learning model of the plurality of temporal segmentation machine learning models, second frame predictions based on the first plurality of frames; and wherein to generate the final frame predictions, the instructions, when executed, further cause the computing system to accumulate the first frame predictions and the second frame predictions.

17. The at least one non-transitory computer readable storage medium of claim 16, wherein the instructions, when executed, further cause the computing system to:

train the first and second temporal segmentation machine learning models based on the labels and the final frame predictions; and bypass a third temporal segmentation machine learning model of the plurality of temporal segmentation machine learning models from being trained based on the labels and the final frame predictions.

18. The at least one non-transitory computer readable storage medium of claim 14, wherein to temporally align the ordered list of actions to the final frame predictions, the instructions, when executed, further cause the computing system to execute a dynamic time warping process.

19. The at least one non-transitory computer readable storage medium of claim 14, wherein a second plurality of frames of the video are associated with labeled data, wherein to temporally align the ordered list of actions to the final frame predictions, the instructions, when executed, further cause the computing system to;

temporally align a first subset of actions from the ordered list of actions associated with the first plurality of frames and a first subset of the final frame predictions associated with the first plurality of frames, and bypass a second subset of actions from the ordered list of actions associated with the second plurality of frames and a second subset of the final frame predictions associated with the second plurality of frames.

20. A method comprising:

generating final frame predictions for a first plurality of frames of a video, wherein the first plurality of frames is associated with unlabeled data;

predicting an ordered list of actions for the first plurality of frames based on the final frame predictions; and temporally aligning the ordered list of actions to the final frame predictions to generate labels.

21. The method of claim 20, further comprising:

generating a first loss based on the final frame predictions;

generating a second loss based on the ordered list of actions;

updating a first machine learning model based on the first loss, wherein the first machine learning model is to generate the final frame predictions; and updating a second machine learning model based on the second loss, wherein the second machine learning model is to predict the ordered list.

22. The method of claim 21, wherein the first machine learning model includes a plurality of temporal segmentation machine learning models, and the method further comprises:

generating, with a first temporal segmentation machine learning model of the plurality of temporal segmentation machine learning models, first frame predictions based on the first plurality of frames; and generating, with a second temporal segmentation machine learning model of the plurality of temporal segmentation machine learning models, second frame predictions based on the first plurality of frames; and wherein the generating the final frame predictions includes accumulating the first frame predictions and the second frame predictions.

23. The method of claim 22, wherein the method further comprises:

training the first and second temporal segmentation machine learning models based on the labels and the final frame predictions; and bypassing a third temporal segmentation machine learning model of the plurality of temporal segmentation machine learning models from being trained based on the labels and the final frame predictions.

24. The method of claim 20, wherein the temporally aligning includes executing a dynamic time warping process.

25. The method of claim 20, wherein a second plurality of frames of the video are associated with labeled data, the temporally aligning includes:

temporally aligning a first subset of actions from the ordered list of actions associated with the first plurality of frames and a first subset of the final frame predictions associated with the first plurality of frames, and bypassing a second subset of actions from the ordered list of actions associated with the second plurality of frames and a second subset of the final frame predictions associated with the second plurality of frames.

* * * * *